Feb. 8, 1955          I. ROTKIN          2,701,526
AUTOMATIC AIR FLOW REGULATOR
Filed July 20, 1949
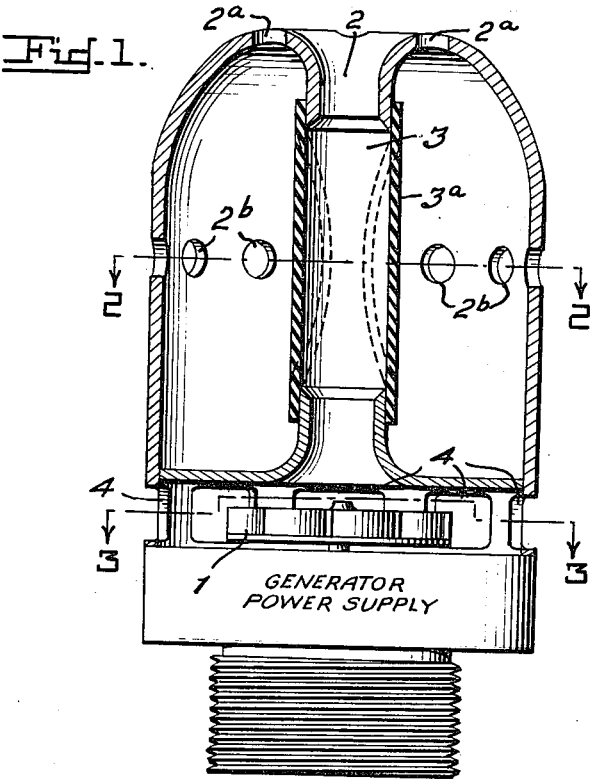
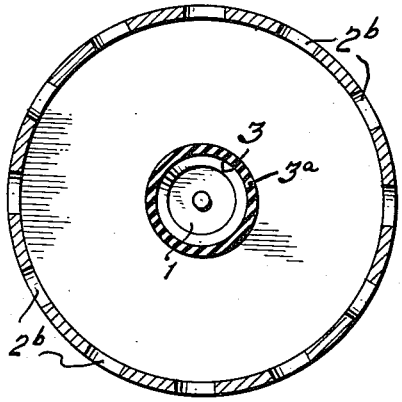
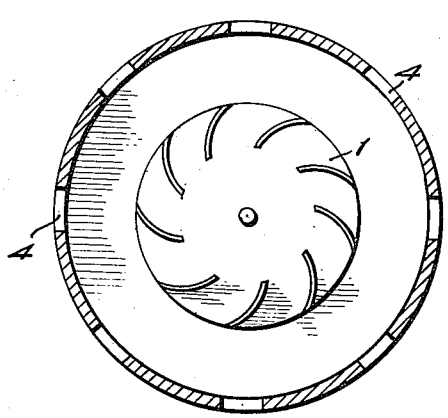
Inventor
Israel Rotkin
By G. J. Kessenich,
J. H. Church and
M. L. Libman
Attorneys

United States Patent Office 2,701,526
Patented Feb. 8, 1955

2,701,526

AUTOMATIC AIR FLOW REGULATOR

Israel Rotkin, Washington, D. C., assignor to the United States of America as represented by the Secretary of the Army Application July 20, 1949, Serial No. 105,857

5 Claims. (Cl. 102—70.2)

(Granted under Title 35, U. S. Code (1952), sec. 266)

The invention described in the specification and claims may be manufactured and used by or for the Government for governmental purposes without the payment to me of any royalty thereon.

This invention relates to automatic air flow regulators and more specifically to a device for maintaining substantially constant the total quantity of air or other gas flowing in a duct despite variations in the air (or other gas) pressure causing the flow. My invention is of particular importance in connection with the control of turbine drives for air-driven generators as will be described below, but it is obviously of general application in any situation requiring automatic control of gas flow in a duct.

In certain classes of ordnance missiles, such as proximity fuses where an electrical circuit is used, the power to operate such circuit is often obtained from an electrical generator driven by a wind vane or turbine operated by the wind stream created by the motion of the missile through the air. In some missiles of this sort, it has been found desirable to locate the generator near the base of the fuse, and to supply the air by means of a duct leading from the nose of the missile to a turbine positioned immediately in front of the generator. The turbine is of radial flow design, and the air is exhausted through ports arranged peripherally in the portion of the fuse which houses the turbine.

In such equipments, it is desirable that the equipment be as light, simple and stable as possible. The generator normally produces alternating current, one portion of which is used to heat the cathodes of any tubes used in the circuit, a second portion being rectified to supply the required plate or "B" voltage. Obviously, it is desirable that the voltage and frequency of the generator output shall remain relatively constant; yet voltage and frequency are governed by the rate of rotation of the generator and hence of the turbine, and the rate of rotation of the turbine, in turn, is controlled by the volume of air passing the turbine in a given period. The volume of air is governed by a number of factors, such as the cross-sectional dimensions of the air duct and the exhaust ports, the speed at which the missile is moving, and the density of the air.

In the case of a missile dropped from air craft, the speed of the missile tends to increase at the same time that air density (nearer the earth) increases, thus causing the turbine to rotate more rapidly, developing higher voltages at higher frequency from the generator. In the case of missiles fired from the ground against airborne targets, the reverse is true, the missile losing air speed as it reaches the more rarefied atmosphere above the earth, thus causing the turbine to rotate more slowly, developing lower voltages at lower frequency from the generator.

My invention, as hereinafter described, is intended to assure relatively constant speed of turbine rotation, and therefore relatively uniform voltage and frequency of generator output. To do so, I make use of the Bernoulli principle that an increase of air velocity over a surface decreases the static pressure on that surface. This principle is used to alter the cross-sectional dimension of the air duct in accordance with the speed with which air passes through the duct, thereby rendering the volume of air passing through the turbine relatively constant within wide limits. This operation will be clear from the following description and reference to the figures, in which:

Figure 1 is a view, partly in longitudinal section, of an embodiment of my device.

Figure 2 is a cross-sectional view taken on line 2—2 of Figure 1.

Figure 3 is a cross-sectional view taken on line 3—3 of Figure 1.

In the drawings, turbine 1 is driven by a stream of air which enters an inlet orifice 2 in the nose of a fuse. The air is conducted through duct 3 to the turbine, from which it passes out through exhaust ports 4.

The walls 3a of the duct 3 are made of flexible material. In the case of a round duct, such material may be rubber or the like; in the case of a rectangular duct, the material of one or more of the walls may be made of a rubber-like material, or if supported only at the end nearest the nose, may be of flexible metal, plastic, etc.

In order to relieve air pressure on the outer side of the flexible wall, auxiliary inlet orifices are provided in the nose of the fuse. These orifices may be positioned to affect the degree of movement of the walls 3a.

When air passes rapidly through duct 3, pressure on the inner surface of the walls 3a is reduced, due to the Bernoulli effect, causing the walls to move inwardly, as shown by the dotted lines in the figure, the degree of such motion increasing as the speed and/or density of the air stream increases. Air pressure on the outer surface of the walls 3a is relieved by holes such as those shown at 2b.

The effect can be intensified by positioning the holes as shown at 2a, when the motion of the missile will cause air to be forced in through such orifices, increasing the pressure on the outer surface of walls 3a.

It will be apparent that as the speed of the air stream is increased, the resultant reduction in cross-section of duct 3 tends to maintain the total amount of air flowing in the duct constant. This in turn keeps the turbine speed, and hence the generator voltage, also constant.

Various positions of the holes can be used in combination to modify these effects, or the provision of external springs or the use of material which is elastic as well as flexible will afford varying degrees of control.

I claim:

1. In an electrical generator for a fuze, the combination of a turbine, a housing for said turbine projecting forwardly of the same and comprising the nose of said fuze, a duct in said housing communicating ambient atmosphere to said turbine, said duct having a flexible portion intermediate its ends responsive to ambient atmospheric changes, said housing provided with peripherally spaced orifices intermediate its ends, said orifices disposed radially of the flexible portion, said portion constricting with an increase in velocity of ambient atmosphere and said orifices relieving the outer surface of said portion of pressure within the housing to provide the turbine with a substantially constant volume of ambient atmosphere under varying ambient atmosphere pressures.

2. In an electric generator for a fuse, the combination of an air flow regulator means and a turbo-generator, said means comprising a casing having assembled in the bottom thereof an air driven generator adapted to be assembled to an explosive missile, said casing having side walls, a front wall and a rear wall adjacent the turbine of said turbo-generator, aligned central apertures in said front and rear walls, a flexible duct connecting said apertures, perforations in said front wall spaced from and radially disposed about the central aperture therein, spaced perforations in said side walls, said flexible duct constricting in proportion to the velocity of the air passing therethrough, the perforations in said side walls in combination with the perforations in said front wall providing means of relieving said duct of ambient atmospheric pressure within the housing and thereby enabling said duct to freely constrict in proportion to said velocity and thereby admitting a substantially constant volume of air to said turbine.

3. In a turbo-generator for a fuse of the class described, an air flow regulator including housing means integral with said turbo-generator, a duct positioned along the longitudinal axis of and within said housing means for directing air to the turbine of said turbo-generator, a flexible hollow element forming an intermediate portion of said duct, said element being constructed to yield radially in response to the velocity of air passing therethrough and thereby automatically control the volume of air to said turbine and stabilize the angular velocity thereof.

4. In a turbo-generator for a fuse of the class described, a housing integral with said turbo-generator and extending forwardly thereof, a duct formed within said housing and in communication with the exterior of the housing and the turbine of said turbo-generator, a portion of the duct being constructed of flexible material adapted to yield radially inward in response to variations in velocity of air flowing therethrough and pressure against the outer side of said portion, and apertures in the housing in a plane of the diametric axis of said duct for relieving said outer side of pressure within said housing.

5. In a turbo-generator for a fuse of the class described, an air flow regulator comprising a hollow toroidal body generated by the revolution about an external axis of symmetry of a generally ellipsoidal figure having its major axis parallel with said axis of symmetry to form a duct through said body, the intermediate portion of said duct being formed of an elastic yieldable material deflecting in response to change in velocity head of fluid flowing through said duct and thereby automatically control the volume of air to the turbine of said turbo-generator and stabilize the angular velocity of said turbine.

References Cited in the file of this patent

UNITED STATES PATENTS

| | | |
|---|---|---|
| 1,000,862 | Voller | Aug. 15, 1911 |
| 2,069,261 | Monet | Feb. 2, 1937 |
| 2,315,019 | Samuelson | Mar. 30, 1943 |
| 2,357,381 | Carlson | Sept. 5, 1944 |